United States Patent
Saxton

(10) Patent No.: US 10,015,116 B2
(45) Date of Patent: Jul. 3, 2018

(54) DYNAMIC BUFFER ALLOCATION

(71) Applicant: 1E LIMITED, London (GB)

(72) Inventor: Mick Saxton, London (GB)

(73) Assignee: 1E LIMITED, London (GB)

( * ) Notice: Subject to any disclaimer, the term of this patent is extended or adjusted under 35 U.S.C. 154(b) by 0 days.

(21) Appl. No.: 15/438,509

(22) Filed: Feb. 21, 2017

(65) Prior Publication Data

US 2017/0244651 A1    Aug. 24, 2017

(30) Foreign Application Priority Data

Feb. 22, 2016    (GB) .................................. 1603034.8

(51) Int. Cl.
*H04L 12/861* (2013.01)
*H04L 12/24* (2006.01)

(52) U.S. Cl.
CPC ........ *H04L 49/9005* (2013.01); *H04L 41/046* (2013.01)

(58) Field of Classification Search
None
See application file for complete search history.

(56) References Cited

U.S. PATENT DOCUMENTS

| | | | | |
|---|---|---|---|---|
| 5,916,309 A * | 6/1999 | Brown | ..................... | G06F 5/065 348/116 |
| 5,920,732 A * | 7/1999 | Riddle | ................ | H04L 49/9026 710/52 |
| 6,317,427 B1 * | 11/2001 | Augusta | .............. | H04L 49/3081 370/357 |
| 7,733,891 B2 | 6/2010 | Reynolds et al. | | |
| 2005/0192967 A1 | 9/2005 | Basaviah et al. | | |
| 2006/0007926 A1 | 1/2006 | Zur et al. | | |
| 2007/0280277 A1 * | 12/2007 | Lund | ..................... | H04L 49/205 370/412 |
| 2009/0154456 A1 | 6/2009 | Dodson et al. | | |
| 2010/0057927 A1 | 3/2010 | Southwick et al. | | |

FOREIGN PATENT DOCUMENTS

| EP | 0932098 A2 | 7/1999 |
|---|---|---|
| EP | 2924933 A1 | 9/2015 |

OTHER PUBLICATIONS

Prasad et al: "Socket Buffer Auto-Sizing for High Performance Data Transfers", College of Computing, Georgia Tech, "Journal of Grid Computing" vol. 1, Issue 4, Dec. 2003.
"Enabling High Performance Data Transfers", Pittsburgh Supercomputing Center, Jan. 1, 2005.
Jain et al: "The TCP Bandwidth-Delay Product revisited: network buffering, cross traffic, and socket buffer auto-sizing", Networking and Telecommunications Group, College of Computing, Georgia Tech, Georgia Institute of Technology, Jan. 1, 2003.
Semke et al: "Automatic TCP Buffer Tuning", Pittsburgh Supercomputing Center, Aug. 1, 1998.

* cited by examiner

*Primary Examiner* — Brian Roberts
(74) *Attorney, Agent, or Firm* — EIP US LLP

(57) ABSTRACT

The present disclosure relates to a switch for a network, and specifically the dynamic allocation of buffer memory within the switch. A communication channel is established between the switch and a network device. The switch configures and allocates a portion of memory to a receive socket buffer for the established channel. Upon receipt of a signal from the network device, the switch allocates a second portion of memory to the receive socket buffer.

13 Claims, 12 Drawing Sheets

DYNAMIC BUFFER ALLOCATION

CROSS-REFERENCE TO RELATED APPLICATIONS

This application claims priority to Foreign Application No. GB1603034.8, filed on Feb. 22, 2016, the content of which is hereby incorporated herein by reference in its entirety.

BACKGROUND OF THE INVENTION

Field of the Invention

Embodiments disclosed herein relate to a switch for a computer network, and specifically the dynamic allocation of buffer memory within the switch in response to different types of data transmission requirements over the network. Embodiments also relate to a network device configured to communicate with the switch over the network.

Description of the Related Technology

Computer networks allow networked computing devices to exchange data with each other along communication channels (data connections) established using either physical cable media, or wireless media. A network socket is the endpoint of such a two-way communication channel on a computer network.

A switch connects network devices together, electrically and logically, by using data packet switching to receive, process and forward data over a computer network to the intended network device(s). Alternative, older devices, such as network hubs, connected multiple network device together over a computer network by broadcasting the same data to each network socket, and each connected network device. In contrast, a switch forwards data only to a specific network device (or specific multiple network devices). Each network device connected to a switch can be identified using a Media Access Control (MAC) address, a unique identifier allowing the switch to regulate and direct the flow of network traffic, improving the security and efficiency of the network.

When transferring data over a network, each device (including the switch) typically allocates a portion of memory to be used as a temporary "holding pen" for data that is being sent or received, enabling each device to manipulate and prepare the data before sending it on, or saving it. This temporary storage is known as a "buffer", and it ensures that any sent or received data has somewhere to go, i.e., into the buffer temporarily, until its ultimate destination becomes decided and available.

Different computer systems, networks and connection types employ different communication protocols to send and receive data. The most common network for data transmission is the Internet, which uses the Transmission Control Protocol (TCP) as the core protocol of the Internet protocol suite (IP). TCP is a "reliable" protocol which provides acknowledgement of successful delivery of data to the intended recipient(s). Using TCP involves both a "send buffer" and a "receive buffer", for sending and receiving data respectively, and the size of each buffer may be adjusted independently of each other. The send buffer determines how much data to be sent can be temporarily held before receiving acknowledgement that the data has been received, and the receive buffer determines how much data, that have been received and not passed to an upper layer, can be temporarily held before further data can be received at the socket. Furthermore, the TCP "send window" parameter determines the amount of unacknowledged data that can be "in flight" between the sending and receiving sockets of a communication channel, at any given time.

To avoid network traffic congestion, TCP employs a congestion-avoidance algorithm, and each of the parameters (send buffer, receive buffer, send window) can be "tuned" independently to improve traffic throughput. For maximum throughput in a communication channel, the smaller of either the send buffer or the receive buffer is adjusted to be sufficiently large so that any data transfer can saturate the underlying communication channel. A fundamental concept in a window-controlled transport protocol (such as TCP) is the "Bandwidth Delay Product" (BDP), which represents the maximum possible amount of data held on the network circuit at any given time, i.e., data that has been sent but not yet acknowledged. If the bandwidth (bits per second) of the communication channel is C, and the round-trip time (in seconds) is T, the maximum possible throughput (in bits) is achieved when the send window is equal to the BDP, where $BDP = C \times T$. In order to saturate the communication channel, the smaller of either the send or the receive buffer should be equally as large as the BDP. If the size of the smaller socket buffer is less than the receive window, the communication channel will underutilize the path. If the smaller of the send and receive socket buffers is larger than the receive window, the communication channel will overload the path, and depending on the amount of buffering, the transfer may cause buffer overflows, receive window reductions, and throughput drops.

Known methods of TCP tuning are described in "*Socket Buffer Auto-Sizing for High-Performance Data Transfers*" by Ravi S. Prasad et al, which discloses a congestion control method ("SOcket Buffer Auto Sizing"—SOBAS) incorporating an application-layer mechanism that automatically determines the send and receive buffer sizes in order to saturate the available bandwidth in a communication channel while a data transfer is in progress. This is achieved in non-congested paths by limiting the receive buffer size, and therefore by association the maximum possible send window (since the size of the send window is limited by the receive buffer size), so that any data transfer saturates the channel but does not cause a buffer overflow. In congested paths, on the other hand, SOBAS increases the buffer size to maximum, so that the transfer is congestion limited.

The prior art also discloses methods of dynamic buffer allocation in a communication channel. Embodiments disclosed herein provide a novel, pre-emptive solution allowing data to be transferred over potentially redundant existing communication channels, without initiating a new channel, and thereby reducing overheads.

SUMMARY OF THE INVENTION

According to a first aspect of the present disclosure, there is provided a switch for a network, the switch comprising a processor and memory, whereby the processor is configured to establish a first communication channel between the switch and one of at least two network devices, configure, at the switch, a first receive buffer for the first established channel, allocate a first portion of memory to the first receive buffer, and (in response to receiving a first signal from the one of said at least two network devices over the first communication channel established between the switch and said one of said at least two network devices) allocate a second portion of memory to the first receive buffer. This device avoids the need to setup or drop a new connection for the transmission of large data to the switch, and thereby improves efficiency.

Preferably, the processor is further configured to send a first signal to the one of at least two network devices over the first communication channel established between the one of said at least two network devices and the switch, confirming allocation of the second portion of memory to the first receive buffer. Preferably still, the processor is further configured to delay sending the first signal until sufficient second portions of memory are available to allocate the second portion of memory to the first receive buffer. This ensures that the data transfer does not begin until a sufficient memory is allocated to the receive buffer.

The processor may be further configured to send a second signal to the one of at least two network devices (over the first communication channel established between one of said at least two network devices and the switch) and de-allocate the second portion of memory from the first receive buffer. The shared memory is returned to the "pool", and can be allocated to another receive socket buffer as and when it is needed.

In one arrangement, the second portion of memory is greater than the first portion of memory. A small amount of memory is allocated to each receive socket buffer initially. This memory is sufficient to handle the small ("fast") data transfers. When a larger amount of data is to be sent to the switch, the switch allocates memory from a "pool" of large buffers.

Preferably, the size of the first memory portion and second memory portion are predetermined. This significantly reduces the overhead and substantially improves performance for objects that need frequent allocation and de-allocation.

The first portion of memory may be 4 kilobytes and the second portion of memory is 128 kilobytes. The lower limit allows for small ("fast") data transfer between the switch (which represents the majority of all data transferred) to be handled by any channel at any time. The larger limit is suitable for handling the majority of anticipated large data transfers.

In one arrangement, the processor is further configured to receive data from the one of said at least two network devices (over the first communication channel established between the switch and said one of said at least two network devices) and the received data may comprise an amount of data that is smaller in size than the first portion of memory, interposed with an amount of data that is larger in size than the first portion of memory. This ensures the small ("fast") data is not held up by any large ("slow") data being sent at the same time. The small data therefore maintains a kind of priority.

Preferably, the processor is further configured to automatically allocate said first portion of memory to the first receive buffer when the first communication channel is established. Therefore the communication channel always has enough buffer memory to handle the most common, small ("fast") data requests.

The processor may be further configured to dynamically allocate the second portion of memory to the first receive buffer from available second portions of memory that can be allocated to one of either of the least two network devices. Therefore the "pool" of large memory buffers can be used by any socket buffer as and when they need them. The overall memory requirements are reduced, and the buffers can be dynamically allocated to where they are needed.

In one arrangement, the processor is further configured to establish a second communication channel between the switch and another of said at least two network devices and configure, at the switch, a second receive buffer for the second established channel. The processor then allocates a first portion of memory to the second receive buffer, and in response to receiving a signal from the another one of said at least two network devices (over the second communication channel established between the switch and said another one of said at least two network devices), allocates a second portion of memory to the second receive buffer. The switch is therefore able to accommodate large data transfers to multiple sockets in the switch.

Preferably, the processor is further configured to allocate and/or de-allocate any of the first or second portions of memory to the first receive buffer, and the first or second portions of memory to the second receive buffer, asynchronously of one another. Therefore the switch is able to handle, and coordinate, multiple large data transfers to multiple sockets, at different times.

According to a second aspect of the present disclosure, there is provided a network device comprising a software agent configured to establish a communication channel between the network device and a switch, and send a signal to the switch if an amount of data to be transferred from the network device to the switch over the established communication channel is greater than a first predetermined amount. Working in tandem with the switch of the invention, the network device provides a signal before sending any pre-agreed "large" data, so that the switch can allocate an increased memory buffer to the receive socket as described above. In one embodiment the software agent comprises a set of instructions to be executed by the network device to perform the described functionality.

Preferably, the agent is further configured to delay transferring data larger in size than the first predetermined amount until the agent receives a signal from the switch confirming the switch is configured to receive data larger in size than the first predetermined amount. Therefore, not only does the network device provide a signal warning the switch of incoming large data, but also delays sending the large data until the switch confirms it is ready to receive it.

The agent may be further configured to fragment the data that is larger than the first predetermined amount into blocks, equal in size to a second predetermined amount, to be transferred to the switch over the established communication channel. The network device breaks up the large response data into chunks that can be handled by the switch, i.e. data packets the size of the (increased) receive buffer. Therefore the network device is able to transmit, and the switch is able to receive, response data of any size.

In one arrangement, the agent is further configured to interpose transmission of an amount of data that is smaller in size than the first predetermined amount with an amount of data that is larger in size than the first predetermined amount. Therefore, the small and large data responses can be sent at the same time, and the small data is not delayed because of the large data transfer.

According to a third aspect of the present disclosure, there is provided a method of dynamically allocating memory to a receive buffer. The method comprises establishing a first communication channel between a switch and one of at least two network devices, configuring, at the switch, a first receive buffer for the first established channel, allocating a first portion of memory to the first receive buffer, receiving a first signal from the one of said at least two network devices over the first communication channel (established between the switch and said one of said at least two network devices), and allocating a second portion of memory to the first receive buffer. This method avoids the need to setup or drop a new connection for the transmission of large data to the switch, and thereby improves efficiency.

According to further aspects there is provided a computer program comprising a set of instructions, which, when executed by a processor of a switch, causes the switch to execute the method steps set out above.

Further features and advantages will become apparent from the following description of preferred examples, which is made with reference to the accompanying drawings.

DETAILED DESCRIPTION OF CERTAIN INVENTIVE EMBODIMENTS

Initiation of a Switch

Figure 1:
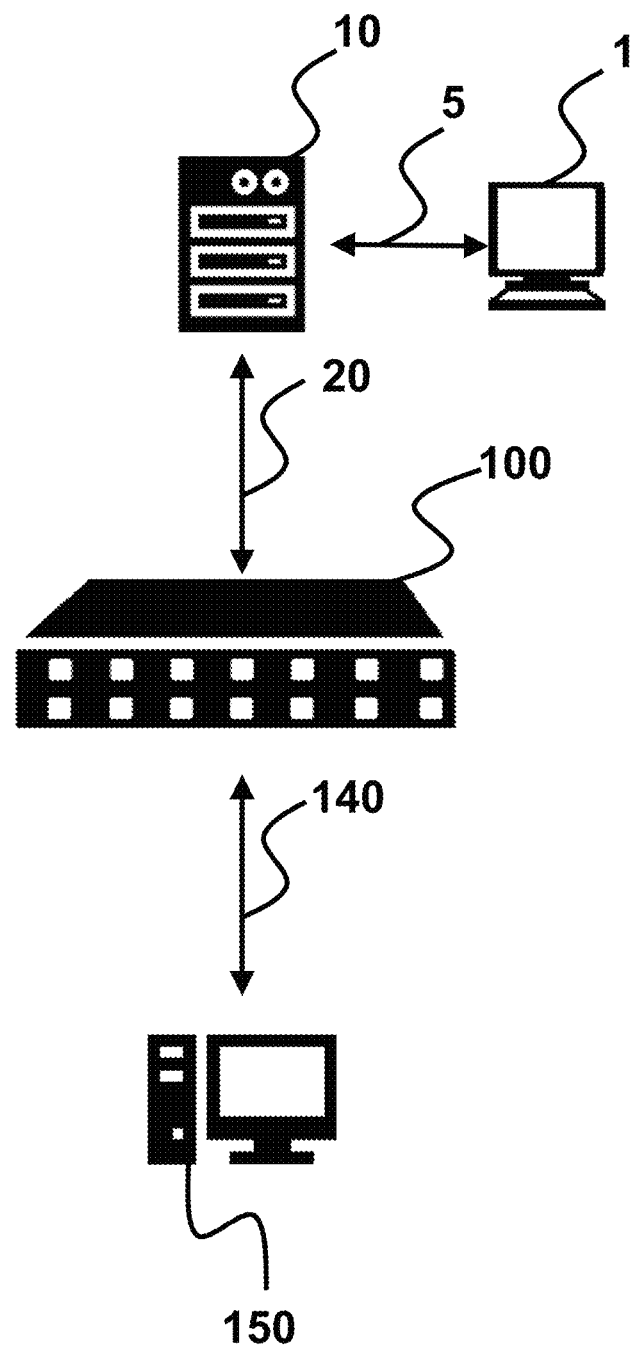
FIG. 1 shows a schematic view of a network device and a server connected over a network to a switch.

FIG. 1 shows a server 10 connected over a network communication channel 20 to a switch 100. In some examples, the server 10 is a webserver. The switch 100 is also connected to a network device 150 via a communication channel 140. There is also shown a user terminal 1 connected to the server 10 by a communication channel 5. An end user may command the server 10 using the terminal 1, to provide instructions to the network device 150, via the switch 100. Furthermore, response data from the networked device 150 may be received at the terminal 1, via the server 10 and the switch 100. In other examples, the server 10 may be accessed and operated by means other than a user terminal 1, such as by another, remote, server over a network connection. The communication of instruction and response data between the network device 150 and the switch 100 is independent of any information transfer between the switch 100 and the server 10.

Figure 2:
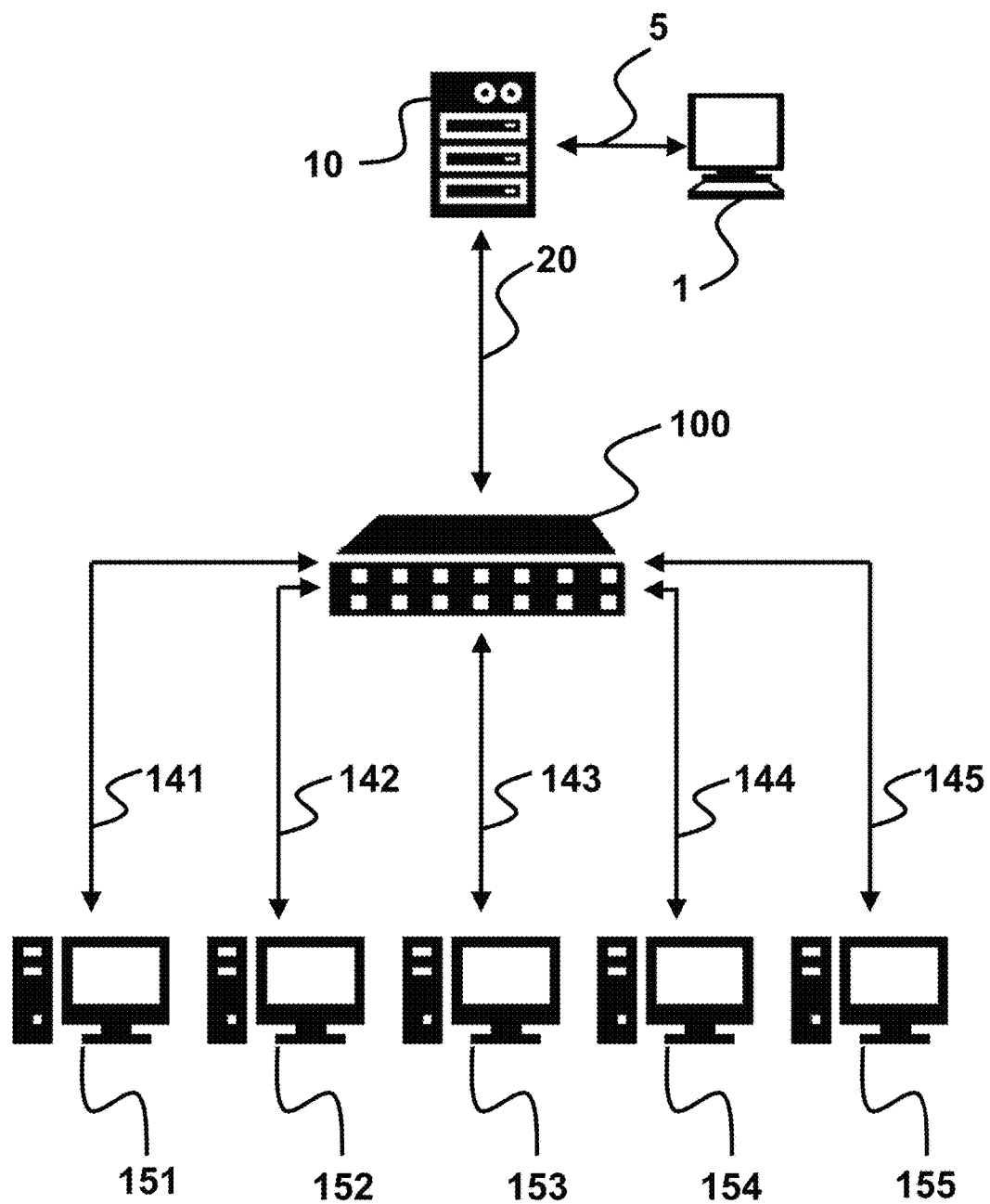
FIG. 2 shows a schematic view of multiple network devices and a server, connected over a network to a switch.

FIG. 2 shows the switch 100 shown in FIG. 1, connected to multiple network devices 151-155 over multiple communication channels 141-145. Instructions are sent to, and response data received from, each of the network devices 151-155 over the network from the terminal 1, via the server 10 and the switch 100. Each network device 151-155 incorporates a software agent (not shown) which can carry out queries or execution requests at each respective network device 151-155 in response to instructions received over the network from the terminal 1, via the server 10 and the switch 100. In a preferred example, each network device 151-155 incorporates only a single software agent. The software agents may also send response data back over the network on their respective communication channels 141-145 to the terminal 1, via the server 10 and the switch 100.

Figure 3A:
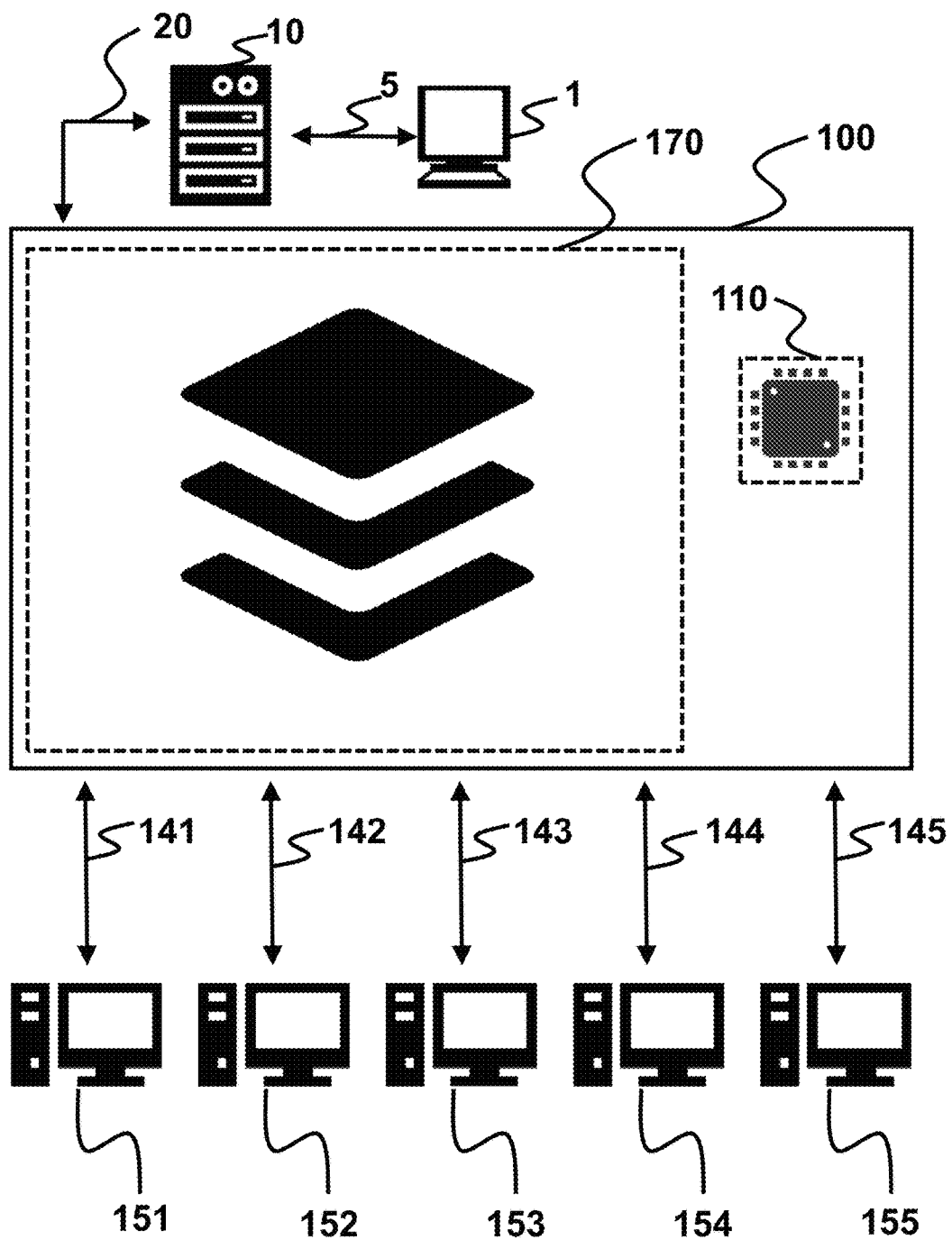
FIGS. 3a to 3c show an expanded view of the switch as seen in FIG. 2 during the initialization of the switch.
Figure 3B:
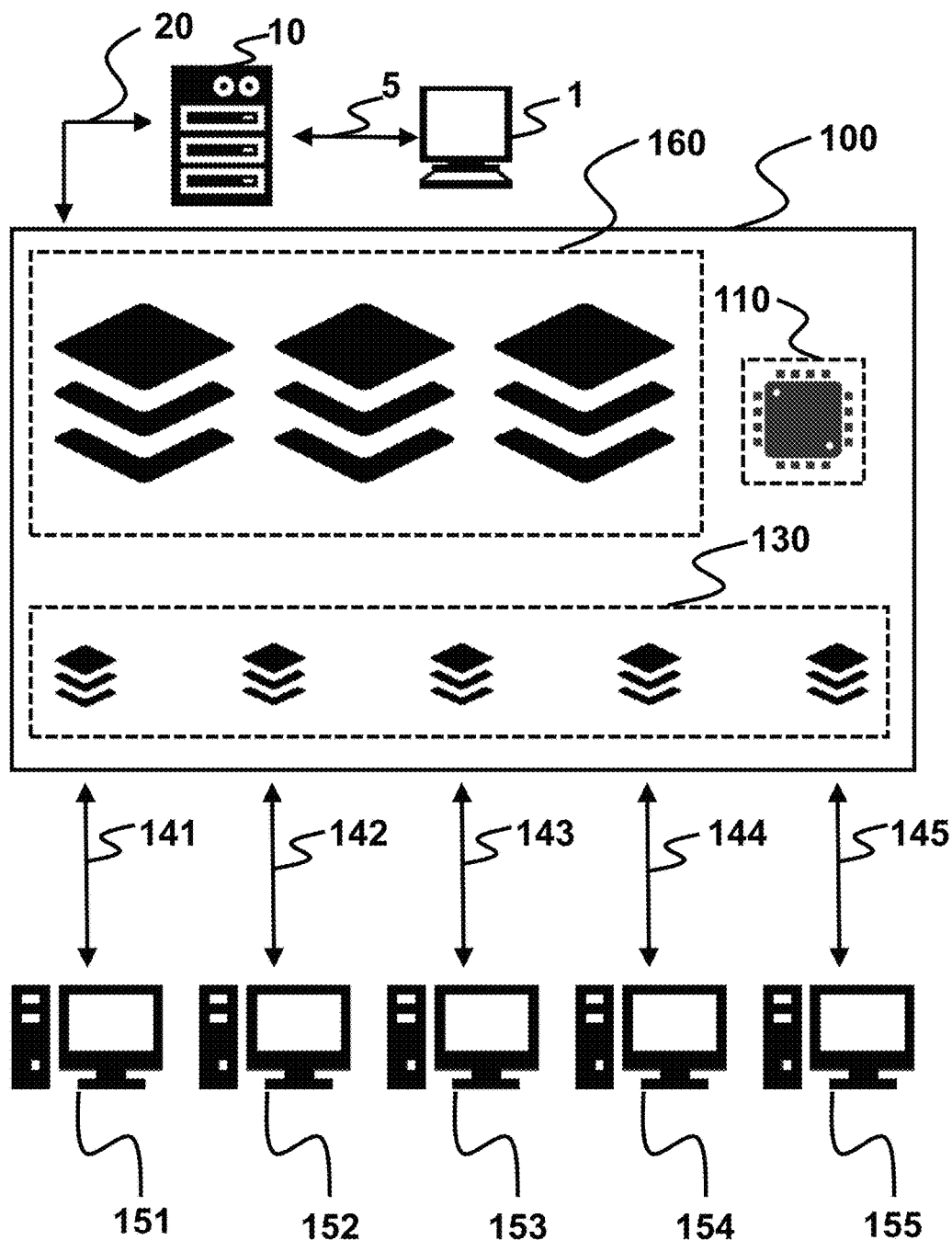
Figure 3C:
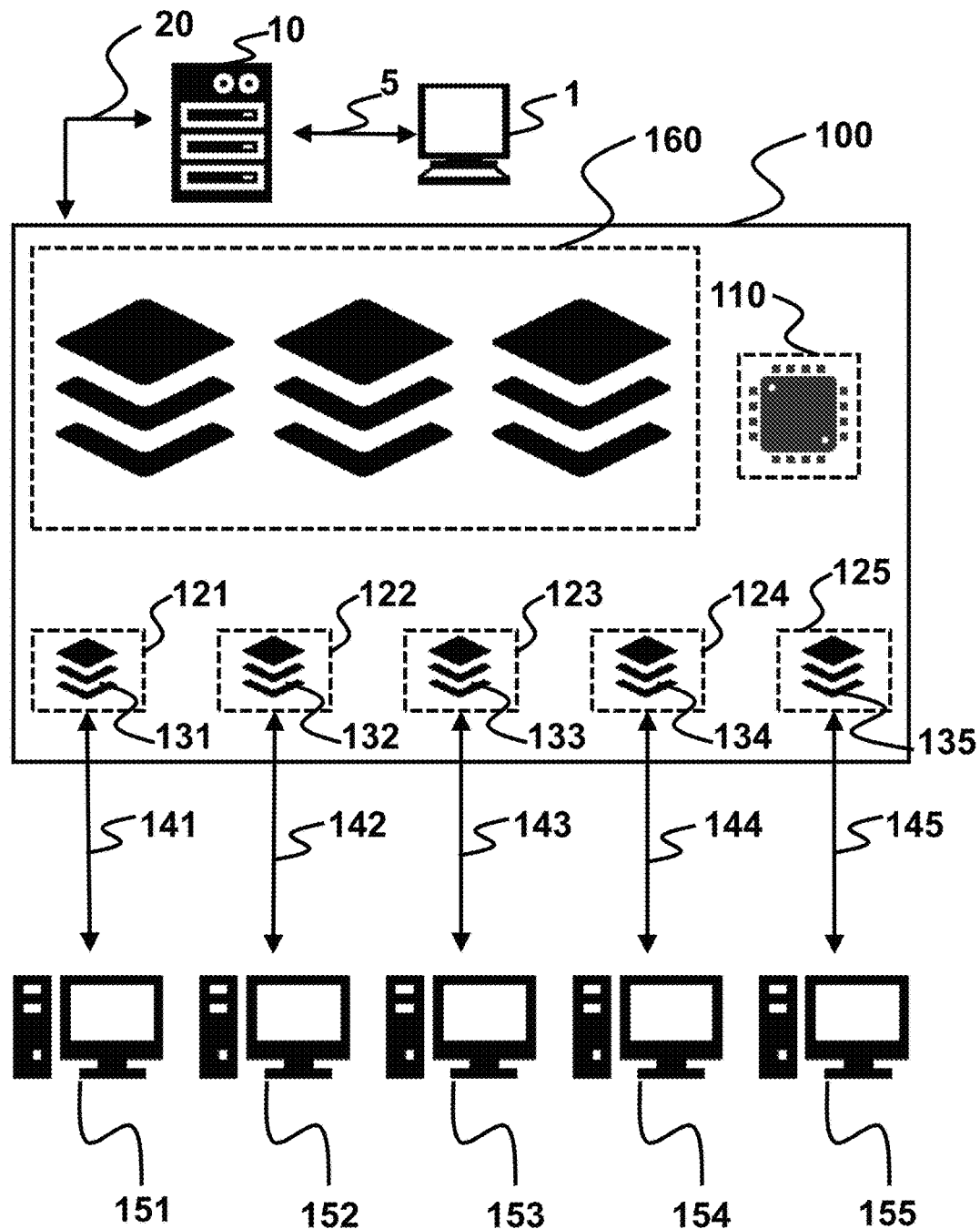

FIGS. 3a to 3c show the switch 100 in greater detail. As seen in FIG. 3a, the switch 100 comprises a processor 110 and memory 170. When the switch 100 is initiated, the processor 110 creates a number of worker processes. The worker processes pre-allocate a socket (communication channel endpoint) in the switch 100 to each of at least one network device 151-155 as the network device(s) connect to the network, and establish a communication channel 141-145 between each network device 151-155 and the switch 100. In a preferred example, the worker processes establish only a single connection channel 141-145 for each network device 151-155, and therefore only a single socket is allocated to each network device 151-155. In a further example, the switch creates up to only 64 worker processes, depending on the number of network devices, software agents, and communication channels requested by any given software agent. The number of worker processes may be limited, for example to 64, so as to avoid the switch 100 overwhelming the server 10 with data in response to any instructions received from the user terminal 1.

If more throughput can be handled by the server 10, then it is possible to incorporate more than one switch 100 on a single server 10. In another example, each worker process pre-allocates up to a maximum of 1024 sockets in the switch 100 for connection to the network. In this example, the upper limit of 1024 sockets per worker process is a result of the default file descriptor bit value (set using the FD_SET command) being limited, and some operating systems require extensive recoding in order to exceed this upper boundary. Therefore, in the abovementioned examples, the maximum number of sockets that can be pre-allocated is limited to under 65,536 (64×1024), wherein a small number of these sockets are reserved for internal communication purposes.

In a preferred example, and as seen in FIG. 3b, during initialization the switch memory 170 is divided into pre-designated (pre-assigned, pre-labelled or pre-allocated) first portions of buffer memory 130 and second portions 160 of buffer memory. These first portions 130 and second portions 160 of buffer memories may be allocated to different sockets within the switch 100 by the processor 110, depending upon the individual socket needs.

As shown in FIG. 3c, the processor 110 establishes a receive buffer 121-125 for each socket. In one example, each receive socket buffer is used to store the "static data" received from each respective software agent, such as the software and the hardware configuration of each respective network device 151-155. Each receive socket buffer 121-125 is also allocated a first portion of memory 131-135, from the pre-designated first memory portions 130, for transfer of data across the socket. This first portion of memory 131-135 is allocated on a semi-permanent basis, and the first portion of memory 131-135 remains allocated to the socket as long as the socket persists. This initial (semi-permanent) allocation of a first portion of memory 131-135 to each socket buffer ensures that each communication channel 141-145 has sufficient memory to work, and therefore eliminates any chance of a memory request being refused by the system, or causing virtual memory thrashing. In one example, the first portion of memory 131-135 allocated to each receive socket buffer 121-125 is relatively small, and in a further example is only 4 kilobytes in size.

Whilst a network device 151-155 is connected via a communication channel 141-145 to the switch 100, instructions may be sent to a chosen network device 151-155 from a server 10 (as directed by a user at a terminal 1) to be carried out on the network device by the software agent. Response data is sent back to the server 10 (and onto the user terminal 1) over the network via the switch 100. For example, an instruction might be to relay usage data of a network device 151-155 back to the server 10 (and onto the user terminal 1), via the switch 100. When the response data from a software agent is smaller than the first portion 131-135 of memory allocated to the corresponding receive socket buffers 121-125 at the switch 100 (i.e. in the example above, under 4 kilobytes in size), it is considered as "small" response data and does not need any additional memory allocated to the receive socket buffer 121-125 in order to be transferred. When the response data from a software agent is larger than the first portion 131-135 of memory allocated to the corresponding receive socket buffers 121-125 (i.e. in the example above, over 4 kilobytes in size) at the switch 100, it is considered as "large" response data and requires additional memory to be allocated to the corresponding receive socket buffer 121-125 in order to be transferred.

Persistent Connection

In preferred embodiments the communication channel(s) 141-145 between the switch 100 and a network device 151-155 is maintained as a "persistent connection", i.e. a single connection to send and receive multiple instructions and responses. After the successful completion of a round of instructions and response data, the communication channel 141-145 is not dropped, but is instead kept open. When the switch 100 sends another set of instructions, and a network device 151-155 responds, the same communication channel 141-145 is used as before. The communication channel 141-145 will remain open until either the switch 100 or the network device 151-155 drops the communication channel. This helps reduce network overheads accrued from dropping and opening communication channels for each instance of data transfer.

Small/Fast Data

Typically, small (or "fast") data makes up the majority of the data transfer between the switch 100 and any network device 151-155, and comprises short instructions to, and small replies from, the network device 151-155. In a first example, the first portion of memory 131-135 allocated to each receive socket buffer 121-125 is used by the switch 100 for receiving of small (or "fast") data responses from the network devices 151-155. Therefore every small (or 'fast') data transfer will automatically have adequate receive buffer memory available because the first portion of memory 131-135 is allocated to each receive socket buffer 121-125 upon initialization of the switch 100. This first portion of memory 131-135 remains allocated to each receive socket buffer 121-125 as long as the corresponding socket persists. It is possible that the connection 141-145 may be dropped, but the socket, and therefore the receive socket buffer 121-125 and first portion of memory 131-134 allocation, is maintained.

Figure 4:
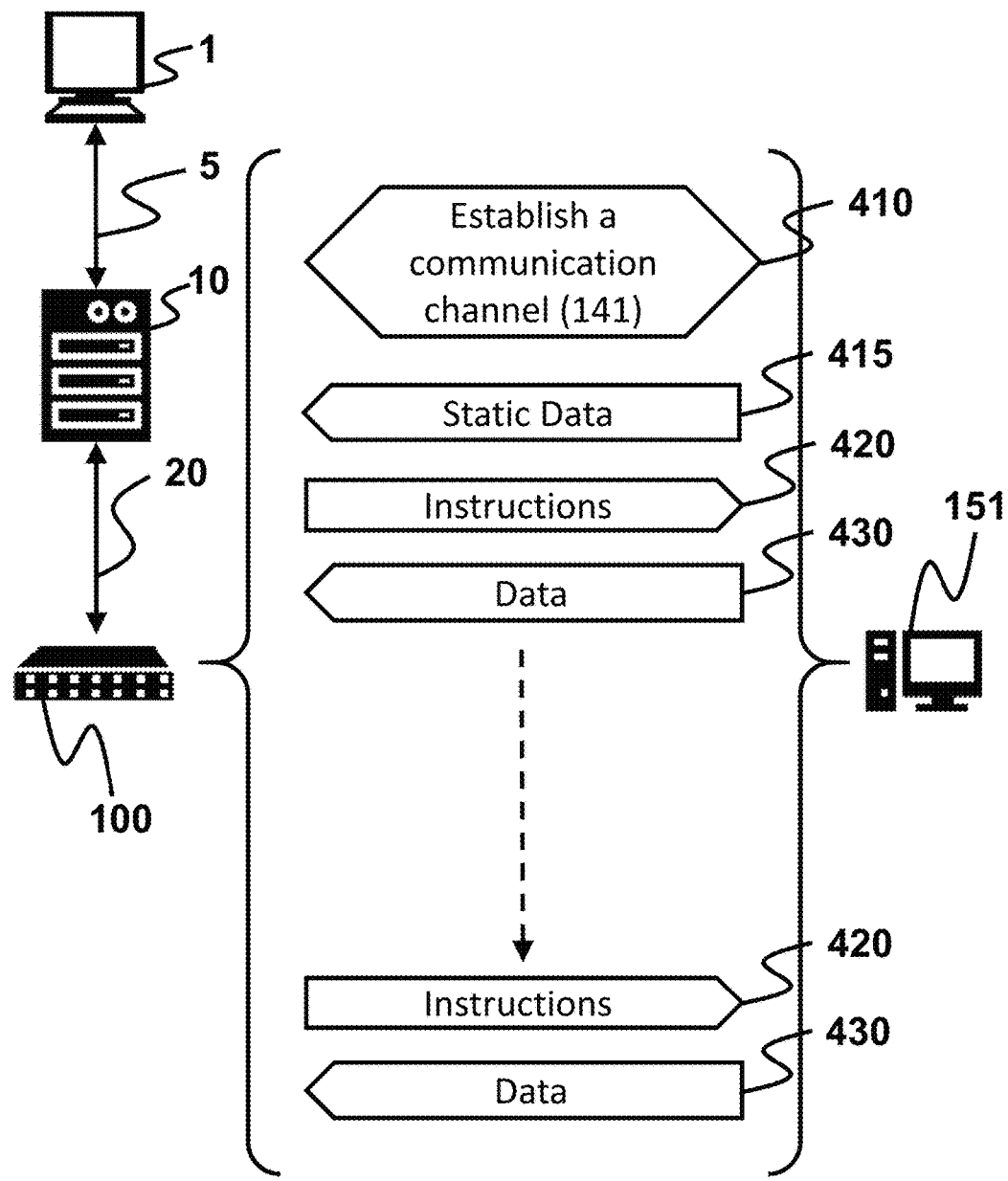
FIG. 4 is a data transmission diagram between the switch and the network device as seen in FIGS. 3a to 3c.

FIG. 4 shows an example of data transfer between the switch 100 and one of the multiple network devices 151-155. Firstly, a communication channel 141 is established between the switch 100 and the network device 151 when the network device 151 connects to the network (step 410). In one example, upon connection to the network, the software agent on the network device 151 may forward "static data" concerning the network device 151 to the switch 100, to be stored in the corresponding receive socket buffer 121 (step 415) in the switch 100.

After the initial network set up is complete, queries or execution requests may be sent from a server 10 (as directed by a terminal 1) over the network, via the switch 100, for the software agent on the network device 151 to carry out (step 420). The software agent carries out the instructions on the network device 151, and sends the response data back to the server 10 (and onto the terminal 1) over the network via the switch 100 (step 430).

Any data exchanged between two sockets on the network is loaded into in a send buffer on the sending side before being sent, and loaded into a receive buffer on the receiving side as it is received. When the inbound response data from the network device 151 to the switch 100 (step 430) is small enough to be accommodated by the receive socket buffer 121 in the switch 100 (i.e. is smaller in size than the first portion of memory 131 allocated to the receive socket buffer 121 of the switch 100), the back and forth request (step 420) and response (step 430) data exchange steps will continue in this manner, with the switch 100 in the present configuration, as long as the communication channel 141 is maintained.

Large/Slow Data

In the event that data to be sent from a network device 151 is larger in size than the initial corresponding receive socket buffer 121 (i.e. larger in size than the first amount of memory 131 allocated to the said receive socket buffer), then the processor 110 of the switch 100 allocates a second portion of memory 161, from the available second portions of memory 160, to the corresponding receive socket buffer 121.

Figure 5:
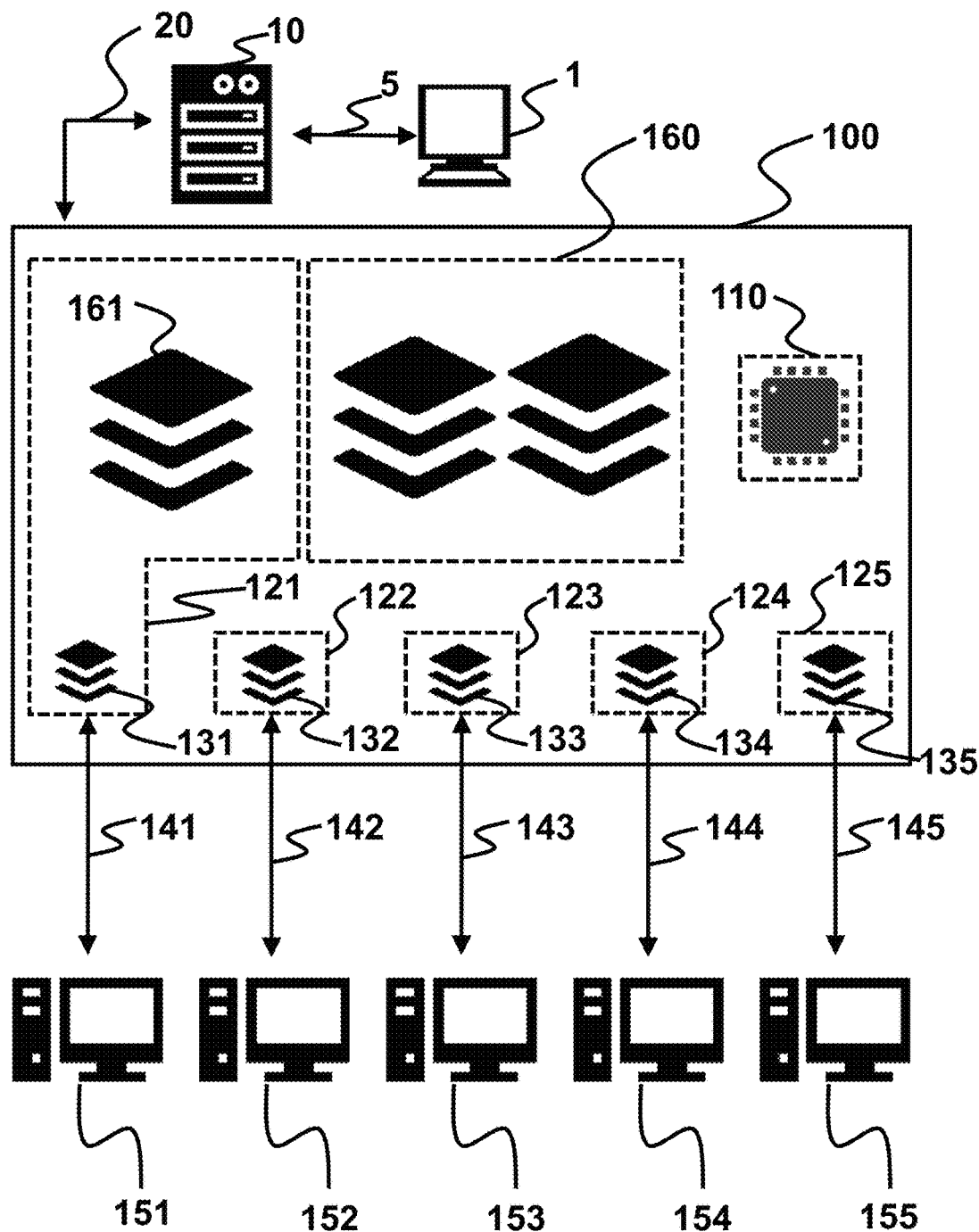
FIG. 5 shows a further expanded view of the switch as seen in FIG. 2.
Figure 6:
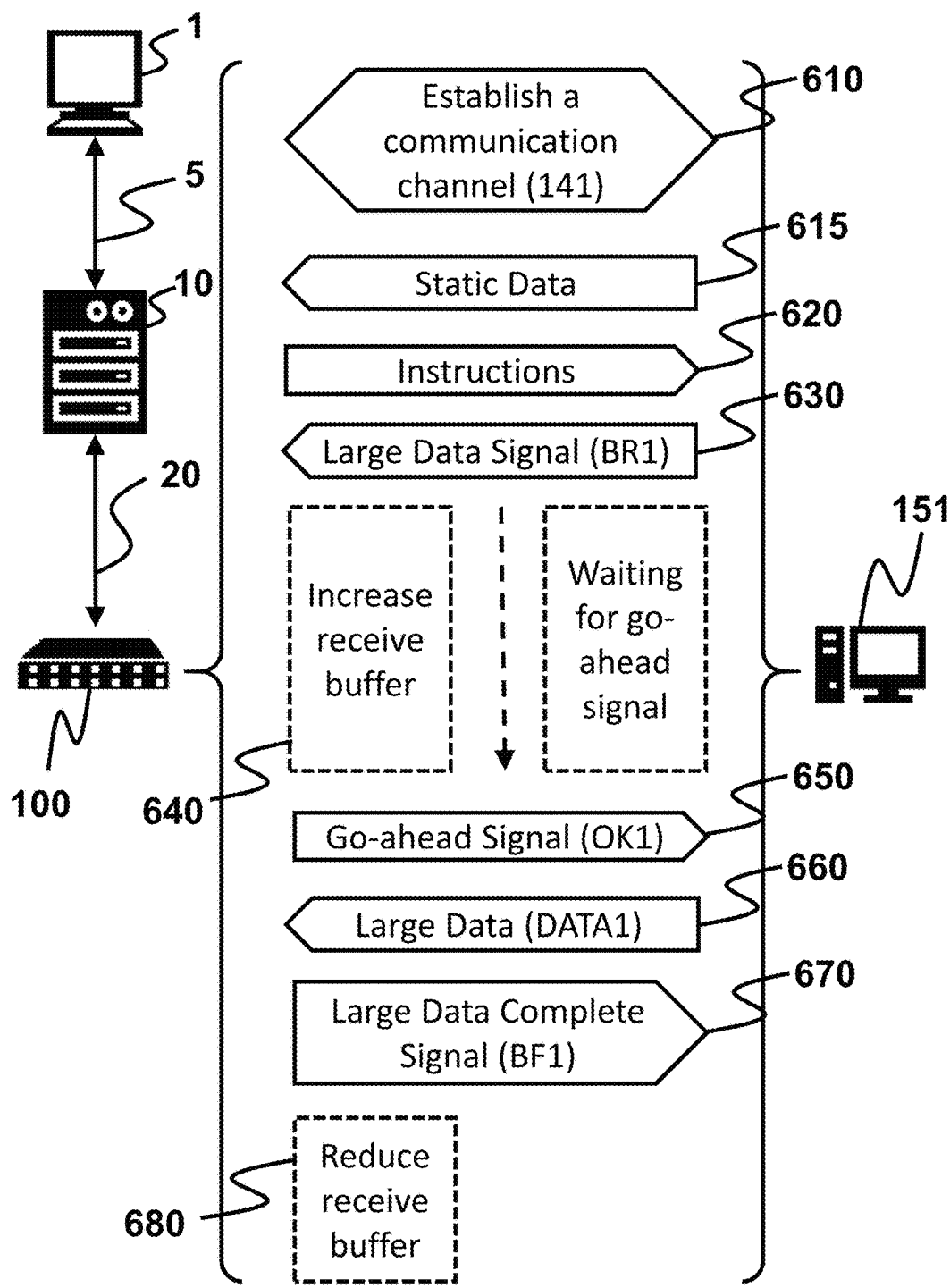
FIG. 6 is a data transmission diagram between the switch and the network device as seen in FIG. 5.

FIGS. 5 and 6 show the configuration of the switch 100 and data exchange between a network device 151 and the switch 100, whereby an instruction results in response data larger in size than the first portion of memory 131 allocated to the receive socket buffer 121 being sent to the switch 100 from the network device 151.

A communication channel 141 is established between the switch 100 and the network device 151 in the same manner as before (step 610) as the network work device 151 connects to the network. In one example, upon connection to the network, the software agent on the network device 151 may forward "static data" concerning the network device 151 to the switch 100, to be stored in the receive socket buffer 121 (step 615). These initial steps (steps 610, 615) are only carried out as each network device 151-155 connects to the network. If the communication channel 141 has already been established, then the process of sending "large" response data from the network device 151 to the switch 100 may begin immediately following the steps shown in FIG. 4 above (steps 410, 415, 420, 430). Once a communication channel 141 has been established, instructions are sent from the server 10 (directed by a user at the terminal 1) over the network, via the switch 100, to network device 151 (step 620). The software agent carries out the instructions on the network device 151 and attempts to send the response data back to the switch 100.

However, in order for the switch 100 to be able to accept any large (or "slow") response data from the network device 151, the processor 110 must first allocate a second portion of memory 161 (from the available second portions 160 of buffer memory) to the receive socket buffer 121 at the corresponding socket (in addition to the first portion of memory 131 allocated upon initiation of the socket).

The second portion of memory 161 is allocated by the processor 110 to the receive socket buffer 121 in response to a signal received from the network device 151, and before transmission of the large data response commences. More specifically, if an instruction, sent from the server 10 over the network via the switch 100 (step 620), results in response data larger than the first portion of memory 131 allocated to the receive socket buffer 121 (e.g. larger than 4 kilobytes, the initial receive socket buffer 121 size), then the network device 151 sends a signal to the switch 100 (step 630), requesting that the switch 100 prepare to receive larger data. This signal is known as the "Big Ready" message (BR1), and indicates the network device 151 is ready to send large response data to the switch 100.

Upon receipt of the "Big Ready" message BR1, the processor 110 of the switch 100 attempts to allocate a second portion of memory 161, from the available second portions of memory 160, to the receive socket buffer 121, in addition to the first portion of memory 131 (step 640). In one example, the second portion of memory 161 allocated to the receive socket buffer 121 is larger than the first portion of memory 131 allocated to the receive socket buffer 121. In a further example, the second portion of memory 161 allocated to the receive socket buffer 121 is 128 kilobytes in size.

Preferably, if allocation of the second portion of memory 161 is successful, the switch 100 sends a go-ahead signal OK1 back to the network device 151 (step 650). The software agent may then begin sending the large response data DATA1 over the communication channel 141 back to the server 10, via the switch 100 (step 660).

The software agent typically breaks up the large response data into "blocks" to be transferred over the communication channel 141 and received by the switch 100. In one example, the large response data is fragmented into blocks of the same size as the second portion of memory 161, e.g. 128 kilobytes. In other examples, the software agent may be configured to fragment any large response data into block of other sizes. As each block is successfully delivered to the switch 100, a further go-ahead signal OK1 is sent by the switch 100 back to the network device 151 (step 650). In a preferred example, the switch 100 analyses the round-trip-time of each block as it is requested and sent by the network device 151. By comparing previously recorded round-trip-times, the switch 100 may estimate the congestion level of the network, and delay requesting the next block of large response data (by delaying sending the go-ahead signal OK1) depending upon the calculated network congestions level (i.e. wait until the network traffic has reduced). The steps of sending a block of data DATA1 (step 660), receiving the block, and signaling the software agent on the network device 151 with a subsequent go-ahead signal OK1 (step 650) may be repeated until the entire message has been successfully transferred.

Preferably, once the switch 100 has successfully received all of the large response data, it sends a "large data complete" signal BF1 (step 670) back to the software agent on the network device 151.

In a further example, once the transmission of large data has been successfully completed, the processor 110 may de-allocate the second portion of memory 161 from the receive socket buffer 121 (step 680), whereupon the de-allocated memory becomes part of the available second portions of memory 160 once more, ready to be "dynamically" re-allocated to any of the receive socket buffers 121-125 as and when needed (i.e. for large/slow data transfers).

In one example, if at any time either the switch 100 or the network device 151 should drop the communication channel 141 between them during transfer of large response data, any large response data transferred during the response session will be lost. In a further example, an error message "Big Error" is sent to the software agent on the network device 151 if the switch 100 is unable to complete the transfer.

By allocating additional memory 161 from the available second portions of memory 160 to the receive socket buffer 121, the switch 100 can transfer large/slow data over the already-existing communication channel 141, and the need to create a new communication channel to accommodate the large/slow response data is eliminated. Additional set-up and tear down of communication channels over the network uses software and hardware resources, and so the present method reduces overall network traffic and system resource consumption.

No Available Memory

In one example, if there are no second portions of memory 160 available for allocation to a receive socket buffer 121-125, the transmission of large data by the software agent is delayed until sufficient amounts of second portions of memory 160 become available. The switch 100 will not send the go-ahead signal OK1 to the network device 151 until a second portion of memory has been successfully allocated to the corresponding receive socket buffer 121-125.

Interposing Small and Large Response Data

In one example, in the event that the network device 151-155 is in the process of sending large response data DATA1 at the same time as instructions for small (or "fast") response data arrive, the small response data may be interposed into the large response data stream to ensure that there is no delay in the small response data being received whilst waiting for one or more large response data to successfully complete. In this way the small response data therefore maintains a priority over the large ("slow") response data.

Multiple Network Devices

Figure 7:
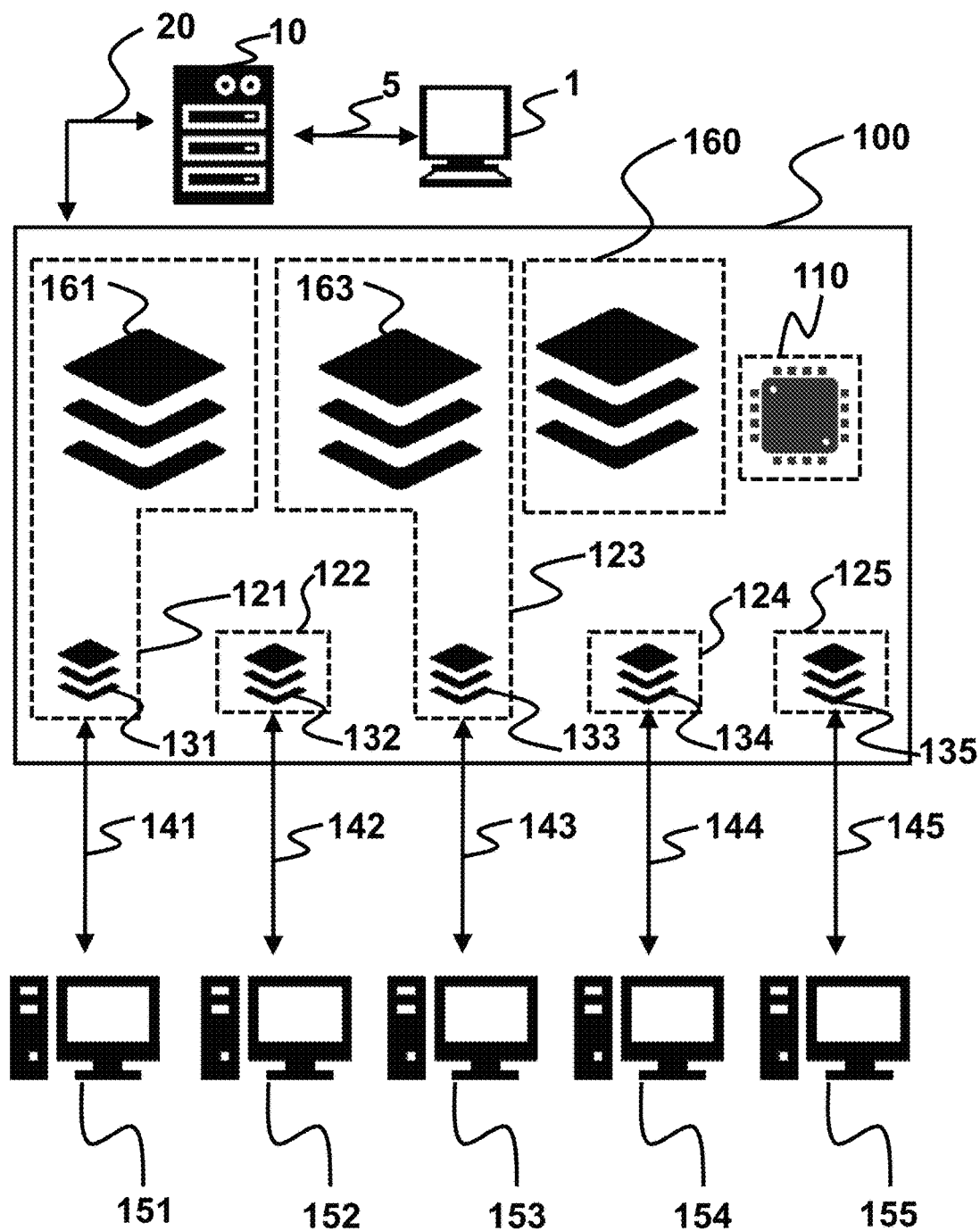
FIG. 7 shows a further expanded view of the switch as seen in FIG. 2.
Figure 8:
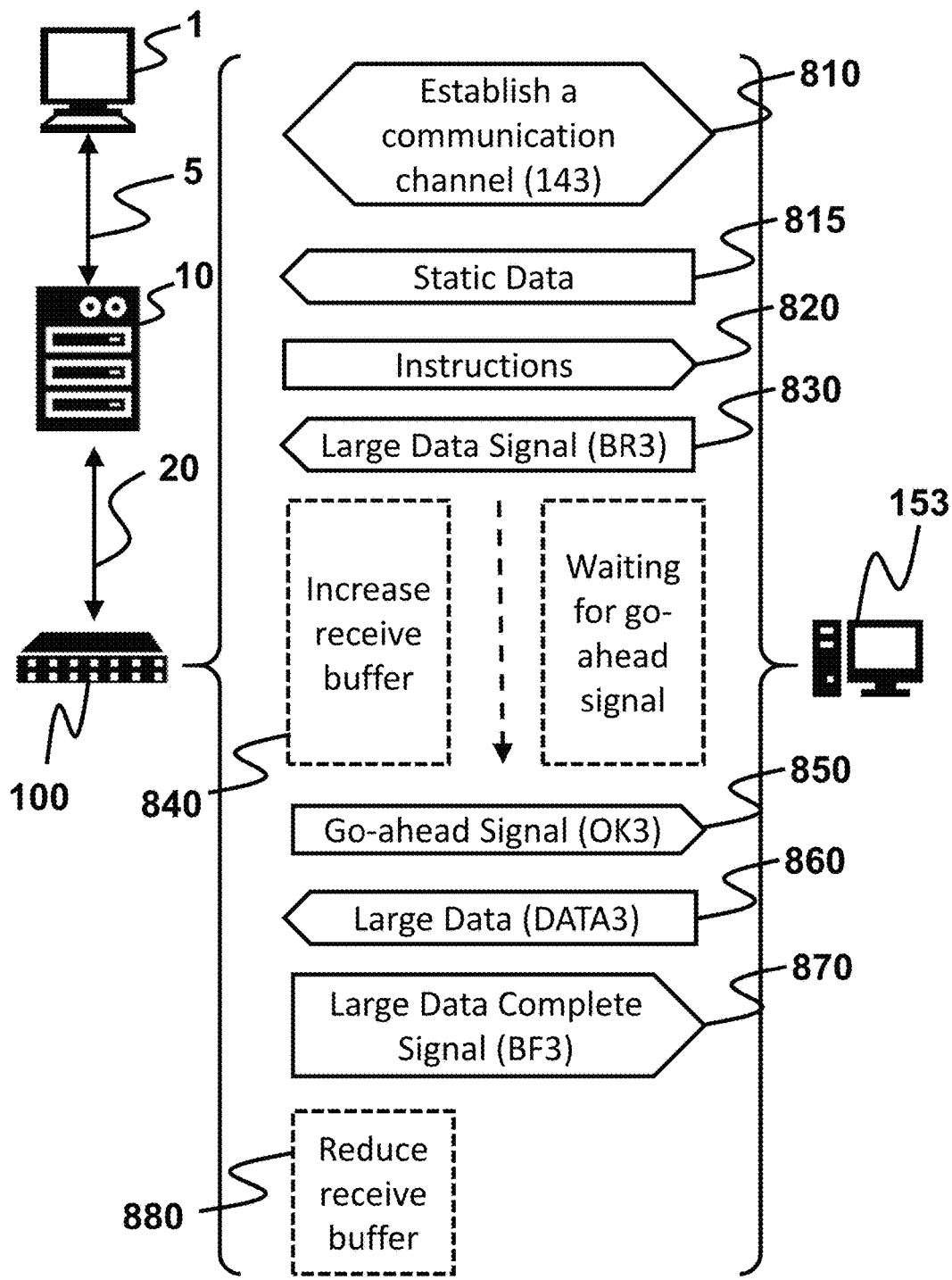
FIG. 8 is a data transmission diagram between a switch and a network device as seen in FIG. 7.

FIGS. 7 and 8 (in conjunction with FIG. 6) show an example whereby the switch 100 is configured to handle multiple network devices 151, 153 attempting to send large response data at the same time.

However, because the network devices 151-155 connected to the switch 100 are able to operate entirely independently of each other, it is likely that each network device 151-155 will connect to the switch 100, receive instructions, and provide response data (both small/fast and large/slow) asynchronously, i.e. at different times to each other. These embodiments simply assume that there is an overlap between the sending of large response data from more than one network device. Preferably therefore, the switch 100 is able to establish multiple communication channels 141-145 and allocate the first portions 130 and second portions 160 of available memory between each of the multiple network devices 151-155 both asynchronously and simultaneously.

Referring to the presently described example—where the large response data is to be transmitted at the same time—it is to be understood that this is one example of such overlap. In this example, two network devices 151, 153 are connected to a switch 100 over corresponding communication channels 141, 143 (steps 610, 810). The processor 110 has configured a receive socket buffer 121, 123 for each socket corresponding with each communication channel 141, 143, and assigned a first portion of memory 131, 133 to each receive socket buffer 121, 123. In one example, upon connection to the network, each software agent on a network device 151, 153 may forward "static data" concerning the corresponding network device 151, 153 to the switch 100, to be stored in the receive socket buffer 121, 123 (steps 615, 815). Whilst further network devices 152, 154, 155 are shown in FIG. 7, in this example they do not require any additional buffer memory beyond the first portions of memory 132, 134, 135 allocated to their corresponding receive socket buffers 122, 124, 125.

As described before, instructions may be sent from a server 10 (as directed by a user at a terminal 1 over communication channel 5) via communication channel 20 to the switch 100, requesting data or the execution of a program on any of the multiple of the network devices 151, 153 on the network. If the response data from the network devices 151, 153 is smaller in size than the first portion of memory 131, 133 allocated to each receive socket buffer 121, 123 in the switch 100, then each network device 151, 153 will communicate with the switch in the manner described previously in relation to FIG. 4.

However, in the example shown in FIGS. 7 and 8 (in conjunction with FIG. 6), the instructions sent to two of the network devices 151, 153 (steps 620, 820) have resulted in large response data (i.e. that larger in size than the first portion of memory 131, 133 allocated to the corresponding receive socket buffers 121, 123). Each of the software agents deployed on these network devices 151, 153 sends a "Big Ready" signal BR1, BR3 to the switch 100 over the corresponding communication channel 141, 143 (steps 630, 830). If there is are sufficient second portions of memory 160 available, then the processor 110 will allocate a second portion of memory 161, 163 to each receive socket buffer 121, 123 as necessary (steps 640, 840). As each of the two receive socket buffers 121, 123 is allocated a second portion of memory 161, 163 from the available second portions of memory 160, the processor 110 in the switch 100 sends a go-ahead signal OK1, OK3 over each corresponding communication channel 141, 143 informing the software agent on each corresponding network device 151, 153 that the switch 100 is ready to receive the large response data on the corresponding communication channel 141, 143 (steps 650, 850). The software agents deployed on the two network device 151, 153 then begin sending their respective large response data DATA1, DATA3 back to the switch 100 (steps 660, 860). The software agents may break the large response data into blocks smaller than or equal to, in size, the second portion of memory 161, 163 allocated to the corresponding receive socket buffers 121, 123.

As each block is successfully delivered to the switch 100, further go-ahead signals OK1, OK3 are sent by the switch 100 back to the network devices 151, 153 (steps 650, 850). The steps of sending a block of data DATA1, DATA3 (steps 660, 860), receiving the block and signaling the software agent on the network device 151, 153 with the go-ahead signal OK1, OK3 (steps 650, 850) may be repeated for each corresponding network device 151, 153 until the entire message (from each device) has been successfully transferred.

In one example, the size of the individual, pre-designated first portions of memory 130 are the same as each other. In a further example, the size of the individual, pre-designated second portions of memory 160 are the same as each other. In another example, the size of the first and second portions of memory are predetermined, and fixed. A "memory pool" is a term used to describe a pool of fixed-size blocks of memory (often all of the same size). Due to the significantly reduced overhead this method can substantially improve performance for objects that need frequent allocation and de-allocation. Therefore, in an example where embodiments draw secondary portions of memory from a "pool", they will be the same size and predetermined (pre-designated as buffer memory portions), so as to further reduce the overheads.

Preferably, in the event that there are not adequate second portions of memory 160 available to allocate a second portion of memory to one or more of the corresponding receive socket buffers 121, 123 in order to receive the large response data, then the processor 110 will not send the go-ahead signals OK1, OK3 for the respective communication channel 141, 143 until a sufficient amount of memory resources have become available. In the absence of a go-ahead signal OK1, OK3, the software agent on each corresponding network device 151, 153 will not begin the transfer of the large response data DATA1, DATA 3. Only once a go-ahead signal OK1, OK3 for a given communication channel 141, 143 is received by the software agent on the corresponding network device 151, 153 (steps 650, 850) will the large response data transfer DATA1, DATA3 begin for the corresponding communication channel 141, 143 (steps 660, 860).

Preferably, and in accordance to the present example, once each of the large data transfers is successfully completed for the two communication channels 141, 143, the switch 100 sends a large data complete signal BF1, BF3 back to the software agent on each network device 151, 153 (steps 670, 870). In a further example, the corresponding second portions of memory 161, 163 are then returned to the pool of available second portions of memory 160 accordingly (steps 680, 880).

The allocation, and de-allocation, of second portions of memory 160 to any of the receive socket buffers 121-125 is handled by the processor 110 in the switch 100. Preferably, any memory portion may be allocated and de-allocated asynchronously to any other memory, i.e. the processor 110 may manage allocation of second portions of memory 160 to each receive socket buffer 121-125 independently of each other as necessary.

It will be recognized by the person skilled in the art that whilst the above example has been described in relation to two network devices 151, 153 delivering large response data DATA1, DATA3 to the switch 100, the present method can be easily expanded to handle large data responses from more than two network devices connected to the switch 100.

A Method of Dynamic Buffer Allocation

Figure 9:
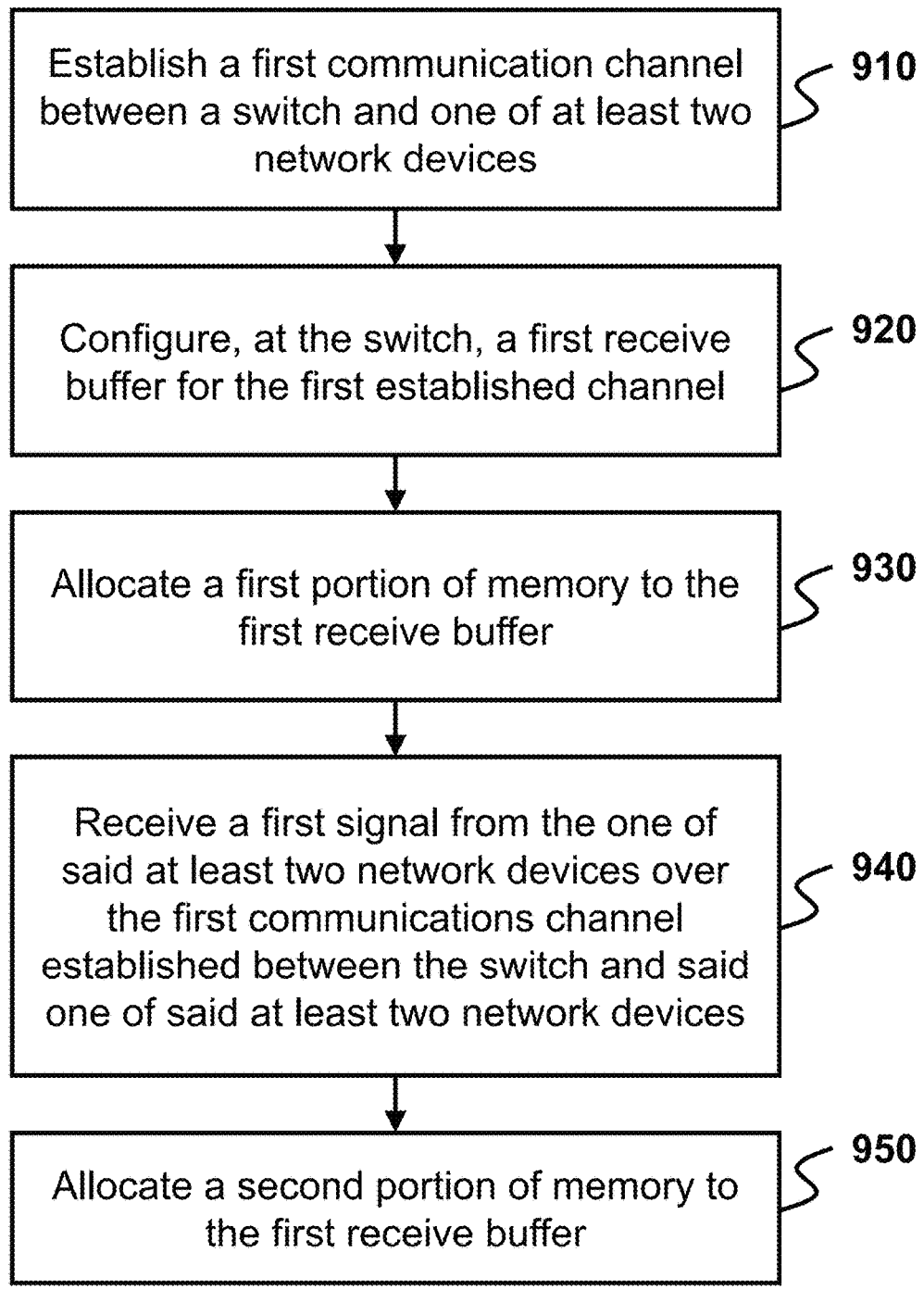
FIG. 9 shows a method of dynamic buffer allocation according to an example.

FIG. 9 shows method steps of dynamic buffer allocation as outlined above. In a first step 910, a first communication channel is established between a switch and one of at least two network devices. In a second step 920, a first receive buffer is configured, at the switch, for the first established channel. In a third step 930, a first portion of memory is allocated to the first receive buffer. In a fourth step 940, a first signal from the one of said at least two network devices is received by the switch over the first communications channel established between the switch and said one of said at least two network devices. In a fifth step 950, upon receipt of the first signal, a second portion of memory is allocated to the first receive buffer. The size of the second portion of memory may be selected based on the content of the first signal.

Non-Transient Machine-Readable Storage Medium

Although at least some aspects of the examples described herein with reference to the drawings comprise computer processes performed in a processor 110, the examples also extend to computer programs, particularly computer programs on or in a carrier, adapted for putting the disclosed method and apparatus into practice. The program may be in the form of non-transitory source code, object code, a code intermediate source and object code such as in partially compiled form, or in any other non-transitory form suitable for use in the implementation of processes according to the examples described. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

Figure 10:
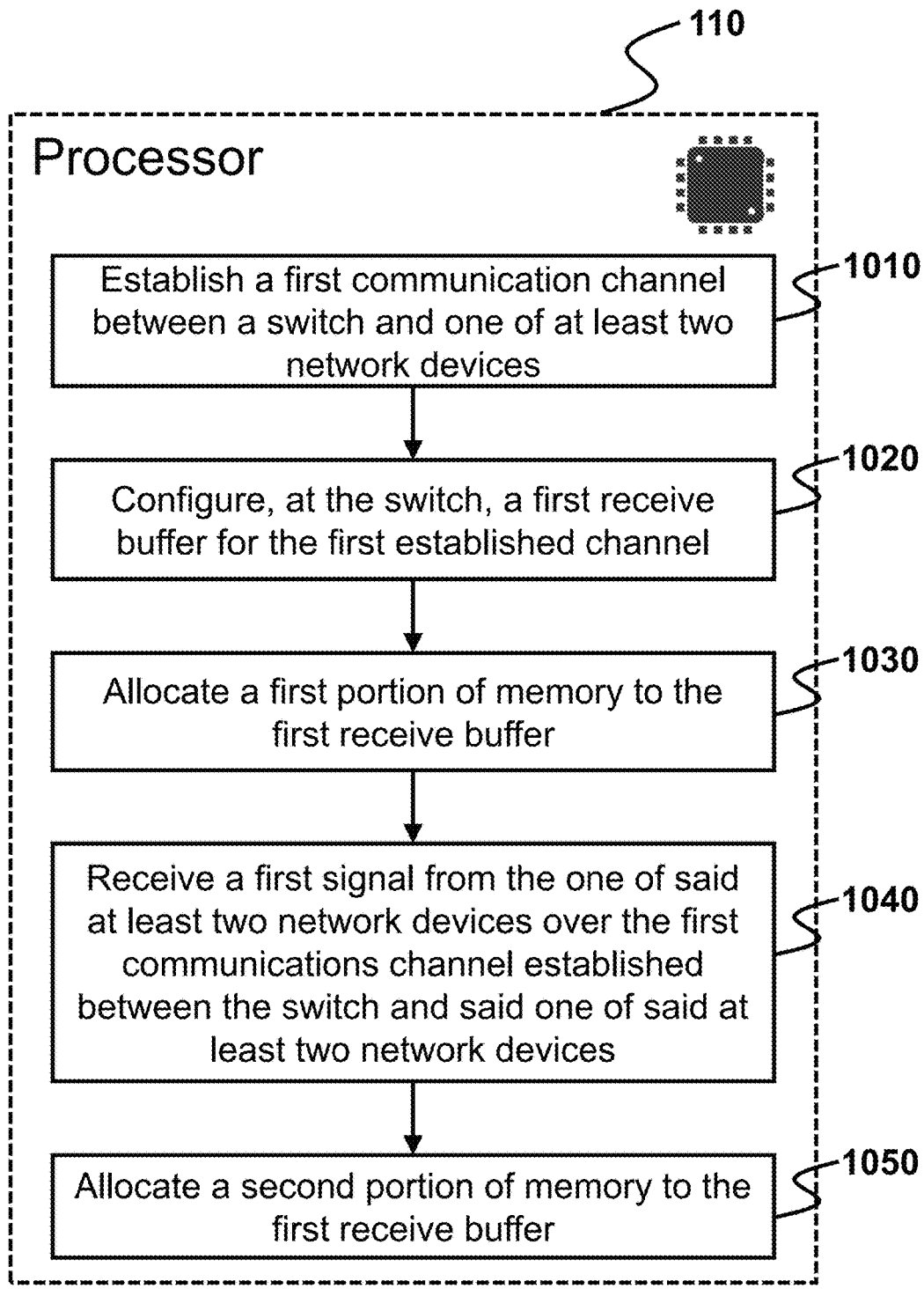
FIG. 10 shows instructions stored in a non-transient machine-readable storage medium to be executed by a processor.

As seen in FIG. 10, the method of dynamic buffer allocation may be implemented by a processor 110 executing instructions stored on a non-transient and machine-readable storage medium. In a first step 1010, the processor 110 establishes a first communication channel between a switch and one of at least two network devices. In a second step 1020, the processor 110 configures a first receive buffer for the first established channel at the switch. In a third step 1030, the processor allocates a first portion of memory to the first receive buffer. In a fourth step 1040, the processor 110 receives a first signal from the one of said at least two network devices over the first communications channel established between the switch and said one of said at least two network devices. In a fifth step 1050, the processor 110 allocates a second portion of memory to the first receive buffer.

It will also be understood that the processor 110 referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the examples provided may be implemented at least in part by computer software stored in (non-transitory) memory and executable by the processor, or by hardware, or by a combination of tangibly stored software and hardware (and tangibly stored firmware).

Message Formats

The "Big Ready" signal sent from any network device 151-155 to the switch 100 indicates that the network device 151-155 is ready to send large response data (i.e. larger in size than the first portion of memory 131-135 allocated to the corresponding receive socket buffer 121-125 at the switch) to the switch 100. In one example, the "Big Ready" signal may be formatted as follows:

BigUpload{"Seq":n,"Size":nnnnnn}

The two parameters indicate the sequence number and the total size of the large response message accordingly. The switch 100 receives the "Big Ready" signal and attempts to allocate a second portion of memory to the corresponding receive socket buffer 121-125 as necessary.

When the switch 100 is ready to receive large response data, the switch 100 replies with a go-ahead signal to the software agent on the network device 151-155. The go-ahead signal identifies the relevant portion of the response data that can be accommodated by the increased receive socket buffer 121-125 at the switch 100, and may be formatted as:

BigReady{"Seq":n, "From":nnnnnn,"To":nnnnnn}

The three parameters indicate the sequence number of the data to be received by the switch 100, the start point in the data to be received, and end point in the data to be received.

Once the software agent has received the go-ahead signal, the software agent may then send part of the large response data to the switch 100. The large response data may be formatted as:

BigData {"Seq":n,"From":nnn,"To":nnn}

The three parameters indicate the sequence number of the data to be sent by the software agent, the start point in the data to be sent, and the end point in the data to be sent to the switch 100.

As an example, when each network device 151-155 is ready to send large response data across the network to the switch 100, the software agent on each network device 151-155 sends the "Big Ready" signal to the switch 100, e.g.:

BigUpload{"Seq":1,"Size":20}

In this example, the first sequence has a size of "20". The switch 100 has allocated a second portion of memory 161-165 with size "5" to the corresponding receive socket buffer 121-125, and so responds with the message:

BigReady{"Seq":1,"From":1,"To":5}

This go-ahead message requests the first five blocks of the sequence. The software agent begins sending back the large response data in the following format:

BigData{"Seq":1,"From":1,"To":5}

When the switch 100 is ready to receive next block of large response data, the switch 100 replies with a further go-ahead signal to the software agent on the network device 151-155, e.g.:

BigReady{"Seq":2,"From":6,"To":10}

This subsequent go-ahead message requests the second five blocks of the sequence. The software agent begins sending back the large response data in the following format:

BigData{"Seq":2,"From":6,"To":10}

This exchange between the switch 100 and the software agent continues in this manner until the large response transfer (of fragmented data blocks) has been successfully completed.

The above examples are to be understood as illustrative examples of embodiments of the present disclosure. Further examples are envisaged. For example, whilst the above examples have been described in terms of features found in a network employing the TCP/IP protocols, the present disclosure is not limited to such, and other networking and transfer protocols may implement the principles of the present disclosure.

In some examples, the initial socket allocation to each network device does not occur at the same time (given that the network devices may connect to the network at different times).

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the present disclosure, which is defined in the accompanying claims.

What is claimed is:

1. A switch for a network, the switch comprising a processor and memory, whereby the processor is configured to:

establish a first communication channel between the switch and one of at least two network devices;

configure, at the switch, a first receive buffer for the first established channel;

allocate a first portion of memory to the first receive buffer, and in response to receiving a first signal from the one of said at least two network devices over the first communication channel established between the switch and said one of said at least two network devices, allocate a second portion of memory to the first receive buffer, wherein:

the first signal indicates an amount of data to be transferred from the network device to the switch is greater than a first predetermined amount; and the second portion of memory is greater than the first portion of memory.

2. The switch according to claim 1, wherein the processor is further configured to:

send a second signal to the one of at least two network devices over the first communication channel established between the one of said at least two network devices and the switch, confirming allocation of the second portion of memory to the first receive buffer.

3. The switch according to claim 2, wherein the processor is further configured to:

delay sending the second signal until sufficient second portions of memory are available to allocate the second portion of memory to the first receive buffer.

4. The switch according to claim 2, wherein the processor is further configured to:

send a third signal to the one of at least two network devices over the first communication channel established between one of said at least two network devices and the switch; and de-allocate the second portion of memory from the first receive buffer.

5. The switch according to claim 1, wherein the size of the first memory portion and second memory portion are predetermined.

6. The switch according to claim 5, wherein the first portion of memory is 4 kilobytes and the second portion of memory is 128 kilobytes.

7. The switch according to claim 1, wherein the processor is further configured to:

receive data from the one of said at least two network devices over the first communication channel established between the switch and said one of said at least two network devices, wherein the received data may comprise a further amount of data that is smaller in size than the first predetermined amount, interposed with the amount of data that is larger in size than the first predetermined amount.

8. The switch according to claim 1, whereby the processor is further configured to:

automatically allocate said first portion of memory to the first receive buffer when the first communication channel is established.

9. The switch according to claim 1, whereby the processor is further configured to:

dynamically allocate the second portion of memory to the first receive buffer from available second portions of memory that can be allocated to one of either of the least two network devices.

10. The switch according to claim 1, whereby the processor is further configured to:

establish a second communication channel between the switch and another of said at least two network devices;

configure, at the switch, a second receive buffer for the second established channel;

allocate a third portion of memory to the second receive buffer; and in response to receiving a further signal from the another one of said at least two network devices over the second communication channel established between the switch and said another one of said at least two network devices, allocate a fourth portion of memory to the second receive buffer.

11. The switch according to claim 10, wherein the processor is further configured to:

allocate and/or de-allocate any of the first or second portions of memory to the first receive buffer, and the third or fourth portions of memory to the second receive buffer, asynchronously of one another.

12. A method of dynamically allocating memory to a receive buffer, the method comprising:

establishing a first communication channel between a switch and one of at least two network devices;

configuring, at the switch, the receive buffer for the first established channel;

allocating a first portion of memory to the receive buffer;

receiving a first signal from the one of said at least two network devices over the first communication channel established between the switch and said one of said at least two network devices; and allocating a second portion of memory to the receive buffer, wherein:

the first signal indicates an amount of data to be transferred from the network device to the switch is greater than a first predetermined amount; and the second portion of memory is greater than the first portion of memory.

13. A non-transitory computer-readable storage medium comprising a set of computer-readable instructions stored thereon, which, when executed by a processor, cause the processor to:

establish a first communication channel between a switch and one of at least two network devices;

configure, at the switch, a first receive buffer for the first established channel;

allocate a first portion of memory to the first receive buffer;

receive a first signal from the one of said at least two network devices over the first communication channel established between the switch and said one of said at least two network devices; and allocate a second portion of memory to the first receive buffer, wherein:

the first signal indicates an amount of data to be transferred from the network device to the switch is greater than a first predetermined amount; and the second portion of memory is greater than the first portion of memory.

* * * * *